L. W. BLYMYER.
AUTOMOBILE TRANSMISSION.
APPLICATION FILED OCT. 31, 1911.
1,062,876. Patented May 27, 1913.
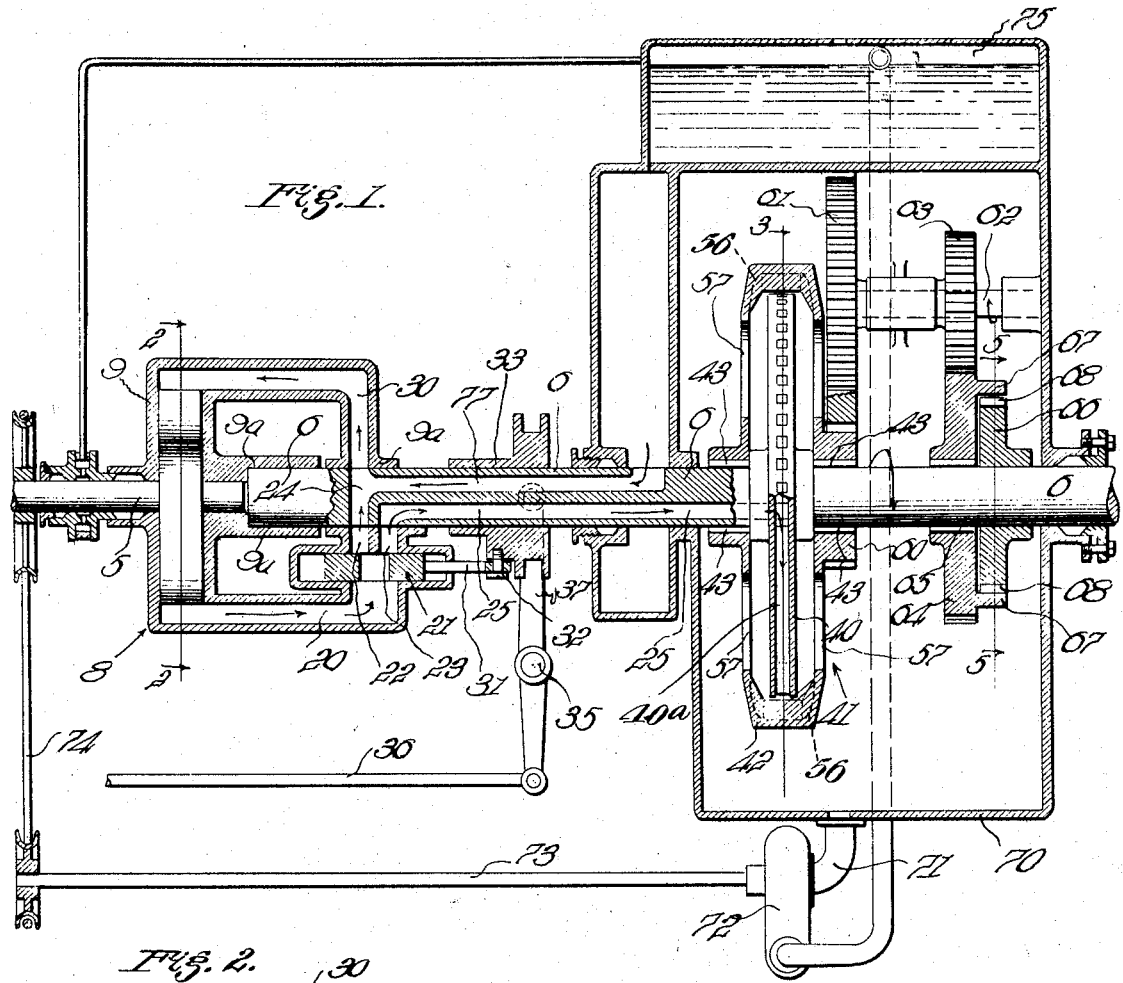
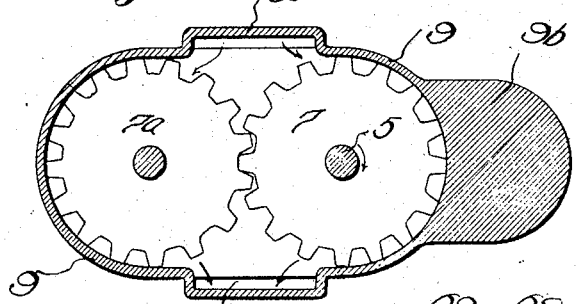
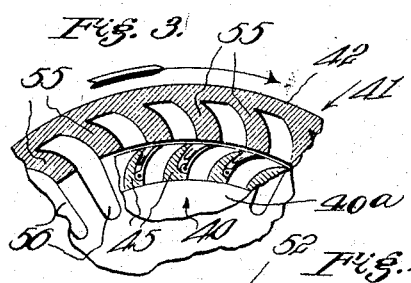
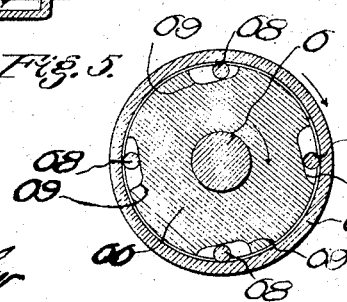
Inventor,
L. Webb Blymyer,
by James T. Barkelew
his Attorney.

UNITED STATES PATENT OFFICE.

LAFAYETTE W. BLYMYER, OF LOS ANGELES, CALIFORNIA.

AUTOMOBILE TRANSMISSION.

1,062,876.   Specification of Letters Patent.   Patented May 27, 1913.

Application filed October 31, 1911. Serial No. 657,734.

*To all whom it may concern:*

Be it known that I, LAFAYETTE WEBB BLYMYER, a citizen of the United States, residing at Los Angeles, in the county of Los Angeles, State of California, have invented new and useful Improvements in Automobile Transmissions, of which the following is a specification.

This invention relates to a transmission particularly adapted for use in automobiles, although it may be of great utility in other situations; and the prime object of the invention is the provision of a device whereby the relative speeds of a driven and a driving shaft may be varied gradually, instead of in steps as is now usually the case, and whereby the full amount of available energy may be transmitted to the driven shaft at both relatively low and high speeds thereof.

So far as I am now aware, there have been and are now several styles of transmissions available. The first of these is the ordinary gear transmission in which the change of speed is accomplished step by step; the objections to this form of transmission are merely the objections to the step by step operation. In the frictional form of transmission the relative speeds of the driving and driven shafts may be changed gradually, but there are mechanical difficulties inherent in the friction drive rendering it impracticable for certain kinds of work. For instance, the friction drive is not positive in its nature; and it is subject to excessive wear. In a third form of transmission a fluid resistance, in some form or other, is used as a driving medium between the driving and driven shafts. The ordinary form taken by this type comprises a liquid pump of some character arranged between the two shafts so that any relative rotation of the shafts will cause the liquid pump to force a stream of liquid through an appropriate system. By increasing the impediment to the flow of this liquid the resistance against which the pump works may be greatly increased and the relative rotation of the two shafts thereby diminished. When the resistance to liquid flow is the least then the relative rotation of the two shafts is the greatest; and when the resistance to liquid flow is greatest then the relative rotation of the two shafts is the least. In other words, in a perfect mechanism, totally stopping the flow of the liquid will practically lock the two shafts together and cause the driven shaft to rotate at the same speed as the driving shaft. At this point of relative rotation the efficiency of such a device is at its highest point; it is at intermediate points, when the driven shaft is rotating more slowly than the driving shaft, that a device of this type becomes very inefficient.

Taking the case where the driven shaft is rotating at one half the speed of the driving shaft, it must necessarily be that there is some impediment to the liquid flow, but still not sufficient impediment to entirely stop that flow; in other words, a portion of the liquid is allowed to flow freely while another portion is stopped from flowing, or the whole stream of liquid is partially interrupted. The pump performs a certain amount of work in forcing the liquid against the impediment and this amount of work or energy is subtracted from the total amount deliverable to the driven shaft. In an automobile it is usually desirable that the full energy of the engine or other prime mover be delivered to the wheels especially when the car is running on "low gear." In a device of this type the full energy is only transmitted to the driven shaft when the driving and driven shafts are running at equal speeds, when the car is running on "high gear." The disadvantage, then, in this type of mechanism is in the consumption or waste of energy by the action of the liquid or fluid pump against an abutment, such as the partial closure of a valve across the pipe in which the liquid is circulated. In my device I have sought to overcome this difficulty by providing means whereby the energy lost by the action of the liquid pump itself, which energy might be styled the energy of relative revolution of the driving and driven shafts, may be utilized to aid in the rotation of the driven shaft.

In its practical aspect the invention takes the form of a liquid pump arranged between the driving and driven shafts and of a motor of some sort connected to the driven shaft, the arrangement being such that, when it is desired to impede the circulation of the liquid by the pump, a portion or all of the liquid may be directed to this motor and cause the motor to return a large proportion of the energy otherwise wasted to the driven shaft.

I have shown in the accompanying drawings and will explain in the following specification a typical form of device which I believe to embody my invention in a practical machine; but I do not thereby limit myself to the peculiar structure or arrangement shown, believing my invention to broadly consist in the above outlined combination and only specifically in the particular mechanism described hereinafter.

In the accompanying drawings Figure 1 is a vertical longitudinal section illustrating my complete invention. Fig. 2 is a cross section taken on line 2—2 of Fig. 1. Fig. 3 is an enlarged section taken on line 3 of Fig. 1. Fig. 4 is an enlargement of a portion of Fig. 3. Fig. 5 is a section taken on line 5—5 of Fig. 1.

In the drawings 5 designates a driving shaft, propelled from any suitable source of power, and 6 designates a driven shaft (being the shaft driven through the medium of the mechanism about to be explained). Mounted on the end of driving shaft 5 is one rotatable member 7 of a gear pump 8. The casing 9 of this gear pump is rigidly mounted at $9^a$ on shaft 6, and the casing is counter-balanced as at $9^b$ so that it may rotate with driven shaft 6 and be in good balance. The other rotating member $7^a$ of the gear pump is mounted on a suitable shaft within casing 9. Member 7 being mounted on shaft 5 and casing 9 being mounted on shaft 6, it will be seen that a relative rotation of the two shafts will cause the operation of the pump. This pump is typical of any device which will cause a circulation of liquid in the direction indicated by the arrows in Figs. 1 and 2; I merely utilize a pump of the character shown and described for the reason that its mechanism is simple and that it lends itself very readily to mounting on the two shafts 5 and 6.

The liquid moved by the operation of the pump passes through a suitable passage 20 to a slide valve 21. This valve is preferably of the sliding type; any valve which will cause the operation immediately hereinafter described will suffice. I have merely shown a simple form of slide valve to typify any form of valve which will perform the necessary operation, namely, the diversion of the fluid flow from passage 20 into passages 22 and 23 as may be desired. Passages 22 and 23 connect with passages 24 and 25, respectively, passage 24 leading across shaft 6. Passage 24 connects with a passage 30 which corresponds in location to passage 20, and through this passage 30 the liquid, preferably some lubricating oil, is led back to the casing 9 of the gear pump. By moving valve 21 it will be seen that the total flow of liquid from passage 20 may be thrown into passage 30 or into passage 25; or the flow may be divided proportionately between the two passages. The valve is shown in such a position in Fig. 1. A valve stem 31 connects at 32 with a sleeve 33 slidably mounted on shaft 6, the sleeve being slidable through the medium of a suitable arm 34 pivotally mounted at 35 and operated by a connecting rod or other suitable means 36. By moving connecting rod 36, which rod may be attached to any convenient manually engageable member, the valve 21 may be moved so as to divert the fluid through passages 25 and 30 just as is desired. When the fluid is diverted entirely through passage 30 then the circulation is practically unimpeded (except for the friction afforded by the walls of the passages). The rotation of members 7 and $7^a$ within the casing 9 will then continue practically unimpeded; and shaft 5 may rotate without transmitting any torque to shaft 6. Shaft 6 will then remain stationary. However, if a certain portion of the fluid flow be directed through passage 25, this portion of the fluid flow is impeded by the reaction of the motor mechanism about to be described and, consequently, a certain resistance is offered to the movement of the fluid by the gear pump. This immediately causes the rotation of the casing 9 of the gear pump to an extent corresponding to the amount of impediment offered to the liquid circulation. Thus shaft 6 may be rotated very slowly by moving valve 21 very slightly to divert a portion of the fluid flow through passage 25; or the shaft 6 may be rotated at its maximum speed by the diversion of all of the fluid through passage 25.

Broadly considered, the above described mechanism, outside of its combination with the motor mechanism about to be described, is old, having been used in this art of transmission for some time. It is in the combination of the foregoing described mechanism with the motor mechanism that my invention particularly consists; and the invention consists, first, broadly in the combination of two such mechanisms in such a manner as to be described, and second, in the specific combination and mechanisms which I deem preferable and have shown in the drawings.

Mounted rigidly upon shaft 6 I have shown the rotary member 40 of a liquid turbine 41, the outer member 42 of this turbine being mounted on bearings 43 on shaft 6, which bearings allow the outer member or element 42 to rotate independently of the shaft 6. Rotary member 40 is provided with suitable vanes 45 which direct the liquid flow from a radial, through a curved path, to a more or less circumferential direction. Rotary member 40 is hollow, and fluid under pressure is delivered to its interior $40^a$ through passage 25 in shaft 6 (the rigid mounting of the member on the shaft allowing the passage 25 to connect directly with the interior of member 40). From the hollow interior 40ª the fluid flows out through the spaces between the vanes 45. The spaces between these vanes form, in effect, nozzles, and provision is made for making these nozzles of variable size to accommodate the varying quantities of liquid which will be supplied to the turbine. This is provided for, as shown particularly in Fig. 4, by having one wall of each of the nozzles formed between the vanes made of a separate piece as is illustrated at 50 in Fig. 4. This piece is pivoted at 51 and a spring 52 tends to throw it outwardly so as to contract the nozzle against the pressure of the fluid passing therethrough. When the fluid pressure becomes greater, when there is a larger quantity of fluid being forced through the turbine, the piece 50 will be forced back against the pressure of spring 52 and the nozzle will expand to accommodate the larger volume of liquid. The liquid passes out through these expansible nozzles into the space between vanes 55 on outer turbine member 42. From the space between these vanes the liquid escapes through side passages 56 and emerges from the interior of the turbine through openings 57, which may be the openings between the radial arms supporting the outer rim of member 42. The vanes and nozzles on member 40 may face in either direction with relation to the rotation of shaft 6. There are some advantages which each direction has over the other; and it may be that these advantages will practically balance each other, making it indifferent which direction is assumed, or that the advantages of one direction will outweigh the advantages of the other direction in some particular cases. Mechanically, and patentably, the direction of rotation of the member 42 is not necessarily arbitrarily fixed. If the direction is as indicated in Figs. 1 and 3, then the simple gear connections between the member 42 and shaft 6 will suffice; if the other direction is assumed for the rotation of member 42, then it will be necessary to change the gearing connections. It is only necessary in any case to apply the rotational effort of the member 42 to the shaft 6 to turn it in the same direction as that in which shaft 5 is rotated. It being clear that I may assume either direction of rotation, I have shown and will explain the device with the member 42 adapted to rotate in the same direction as shaft 6. Member 42 is then connected to shaft 6 through the medium of the following explained gearing. A pinion 60 is mounted on member 42 and meshes with a gear 61 mounted on a countershaft 62. A pinion 63 on this shaft meshes with a gear 64 mounted on bearing 65 on shaft 6 so that it may rotate relatively to the shaft. Mounted on shaft 6 and always rotating therewith is a disk 66, this disk being inclosed within a rim 67 on gear 64.

Rollers 68 are carried in pockets 69 in disk 66 and are adapted to engage with rim 67 when the rim rotates in the direction indicated relative to shaft 6. In other words, when rim 67 is rotating in the direction indicated faster than shaft 6, then the rollers 68 will engage the rim so that the rotary motion of the rim is transmitted to the disk 66 and shaft 6. In other words, when member 42 of turbine 41 is traveling at a sufficient rotational speed (and the mechanism is so designed that, when the turbine is in action at all, it will be traveling at a sufficient rotational speed) it will exert a rotational effort on shaft 6 and thereby add to the energy of rotation of that shaft. On the other hand, when shaft 6 is being rotated and there is no rotation of the turbine 41, then the shaft 6 may rotate without carrying the turbine with it, as the shaft may rotate in the direction indicated in Fig. 5 without carrying rim 67 in that direction.

The liquid, preferably oil, which is pumped through the system, and which is exhausted from the turbine, will accumulate in casing 70. This casing at once performs the office of a liquid catch basin and also incloses all of the turbine mechanism in a bath of oil, thoroughly lubricating the same. From this casing 70 a pipe 71 leads to a pump, preferably centrifugal, 72 which is driven through the medium of a shaft 73 and belt connection 74 from shaft 5 or from any other continuously rotating part of the mechanism on which my transmission is placed. The function of pump 72 is to raise the liquid to a storage tank 75 from whence it passes into a chamber 76 which surrounds shaft 6. A passage 77 in shaft 6 connects with chamber 76 and connects with passage 24 in the shaft, thereby connecting with passage 30. This passage provides for supplying oil to the gear pump in its full capacity at all times regardless of the position of valve 21; for the deficiency of oil drawn through passage 24 from valve 21 will always be made up by the amount of oil drawn through passage 77 from chamber 76. When the valve 21 is in position to send the entire oil circulation through passage 25 and through turbine 41, then the entire oil supply for the pump will be drawn through passage 77. When this is the case, then the gear pump is acting against its full resistance and shaft 6 will be traveling at its maximum speed. Turbine 41 will also be exerting its maximum effort to rotate shaft 6; and, between the rotational effort applied by the gear pump and the rotational effort applied by the turbine, the shaft 6 will be rotated with an energy equal to a very large percentage of the energy in shaft 5. Neglecting frictional losses and losses due to the transforming of mechanical energy into liquid pressure and back again, the energy of rotation of shaft 6 should be equal to the energy of rotation of shaft 5. I only lose an amount of energy represented by frictional losses and inevitable losses of transformation.

It will be seen that the gist of my invention consists broadly in the provision of certain motor means to transform the energy of relative rotation of shafts 5 and 6 into energy applicable directly to the rotation of shaft 6. In this I believe my invention to contain entirely and basically novel material, whether the mechanisms employed are similar to the mechanisms shown and described by me, or are entirely dissimilar but acting in the same manner and accomplishing the same objects.

Having described my invention, I claim:

1. In combination with a driving and a driven shaft, a pressure producing mechanism having intake and outlet and adapted to be operated by the relative rotation of the shafts, a motor mechanism comprising two relatively movable parts, one of said motor parts being carried by the driven shaft and the other connected to the driven shaft, and means to connect the inlet and outlet of the pressure producing mechanism together and to divert a portion of the produced pressure to the motor mechanism.

2. In combination with a driving and a driven shaft, a fluid pressure producing mechanism mounted on the shafts and adapted to be operated by their relative rotation, said mechanism having a fluid inlet and outlet, a fluid pressure motor comprising two relatively movable parts one of which is carried by the driven shaft and the other connected to the driven shaft to rotate it in the direction of rotation of the driving shaft, means to connect the inlet and outlet of the pressure producing mechanism together, and means for diverting a portion of the fluid pressure to the motor mechanism.

3. In combination with a driving and a driven shaft, the driven shaft having a pair of longitudinal passageways therethrough, a fluid pump having its relatively moving pumping portions mounted on the driving and driven shafts to be operated by the relative rotation thereof, an inlet and an outlet passage for the pump, the inlet passage connecting directly with one of the longitudinal passageways in the driven shaft, a valve mechanism for connecting the outlet passage of the pump to either the inlet passage thereof or to the other passage in the driven shaft, a turbine rotary member rigidly mounted on the driven shaft and having liquid passages connecting with the last mentioned shaft passage, a coöperating turbine member rotatively mounted on the driven shaft and rotatively connected thereto through the medium of gears and ratchets, and a liquid reservoir surrounding the driven shaft and connecting with the first mentioned shaft passage.

4. In combination with a driving and a driven shaft, an energy transforming mechanism connected between and adapted to be operated by the relative rotation of the two shafts, a motor mechanism comprising two relatively movable parts one of which is carried by the driven shaft and the other connected to the driven shaft, and means to short-circuit the energy produced within the energy transforming mechanism and to divert said energy to the motor mechanism.

5. In combination with a driving and a driven shaft, a fluid pressure producing mechanism mounted on the shafts and adapted to be operated by their relative rotation, said mechanism having a fluid inlet and outlet, a fluid pressure motor comprising two relatively movable parts one of which is carried by the driven shaft, a ratchet mechanism through which the other motor member is connected to the driven shaft to rotate it in the direction of rotation of the driving shaft, means to connect the inlet and outlet of the pressure producing mechanism together, and means for diverting a portion of the fluid pressure to the motor mechanism.

6. In combination with a driving and a driven shaft, an energy transforming mechanism having relatively movable members connected to and adapted to be operated by the relative rotation of the two shafts, a motor mechanism comprising two relatively movable parts one of which is stationary with reference to the driven shaft and its connected member of the energy transforming mechanism and the other connected to the driven shaft, and means to short-circuit the energy produced within the energy transforming mechanism and to divert said energy to the motor mechanism.

7. In combination with a driving and a driven shaft, a fluid pressure producing mechanism having its relatively moving parts permanently connected with the shafts and adapted to be operated by their relative rotation, a motor mechanism comprising two relatively moving parts one of which is connected to the driven shaft to rotate it in the direction of rotation of the driving shaft when the motor mechanism is supplied with fluid pressure, valve means to short-circuit the flow of fluid produced by the pressure producing mechanism and to divert a portion or all of said flow of fluid to said motor mechanism.

8. In combination with a driving and a driven shaft, a fluid pressure producing mechanism mounted on the shafts and adapted to be operated by their relative rotation, a fluid pressure turbine having two relatively moving parts one of which is connected to the driven shaft to rotate it in the direction of rotation of the driving shaft, valve means to short-circuit the flow of fluid produced by the pressure producing mechanism and to divert a portion or all of said flow of fluid to said turbine.

9. In combination with a driving and a driven shaft, a fluid pressure producing mechanism mounted on the shafts and adapted to be operated by their relative rotation, a fluid pressure turbine having two relatively moving parts one of which is connected to the driven shaft, and the other carried by the driven shaft.

In witness that I claim the foregoing I have hereunto subscribed my name this 5th day of October 1911.

LAFAYETTE W. BLYMYER.

Witnesses:
 JAS. H. BALLEGH,
 JAMES T. BARKELEW.